(12) United States Patent
Sontag

(10) Patent No.: US 6,386,234 B2
(45) Date of Patent: May 14, 2002

(54) OVERTRAVEL-DOUBLE SEAT MAGNETIC VALVE

(75) Inventor: Rolf-Helmut Sontag, Schorndorf (DE)

(73) Assignee: Karl Dungs GmbH & Co. (DE)

( * ) Notice: Subject to any disclaimer, the term of this patent is extended or adjusted under 35 U.S.C. 154(b) by 0 days.

(21) Appl. No.: 09/776,414

(22) Filed: Feb. 2, 2001

(30) Foreign Application Priority Data

Feb. 5, 2000 (DE) .......................................... 100 05 262

(51) Int. Cl.$^7$ ................................................. F16K 1/44
(52) U.S. Cl. ................................. 137/625.34; 251/77
(58) Field of Search .................. 137/625.33, 625.34; 251/77

(56) References Cited

U.S. PATENT DOCUMENTS

| | | | | |
|---|---|---|---|---|
| 245,662 A | * | 8/1881 | Rindernecht | 137/625.34 |
| 967,820 A | * | 8/1910 | Nachtigall | 137/625.34 |
| 2,019,193 A | * | 10/1935 | Mueller | 137/625.34 |
| 2,717,003 A | * | 9/1955 | Jay et al. | 137/625.34 |
| 2,731,036 A | * | 1/1956 | Hughes | 137/625.34 |
| 2,984,450 A | * | 5/1961 | Doe | 137/625.34 |
| 3,012,583 A | * | 12/1961 | Gorgens et al. | 137/625.34 |
| 4,114,850 A | | 9/1978 | Alamprese | |
| 5,435,853 A | | 7/1995 | Mieth | 134/8 |

FOREIGN PATENT DOCUMENTS

| | | |
|---|---|---|
| DE | 1025226 | 12/1955 |
| DE | 39 42 437 A1 | 12/1989 |
| DE | 40 35 017 C1 | 11/1990 |
| DE | 41 06 071 A1 | 2/1991 |
| JP | 60-84300 | 3/1998 |

* cited by examiner

Primary Examiner—John Fox
(74) Attorney, Agent, or Firm—Walter A. Hackler

(57) ABSTRACT

In a double seat valve (1) comprising a valve body (8) with an upper valve disk (6) and a lower valve disk (7), an upper valve seat (4) for the upper valve disk (6) and a lower valve seat (5) disposed underneath for the lower valve disk (7), and an adjustment element for the valve body (8) for opening this valve body (8) against the action of a closing spring (9), the valve body (8) is guided displaceably on the adjustment element and that on the adjustment element a limit stop (14) is provided which takes the valve body (8) along in opening direction (10), which limit stop (14) is spaced from its bearing, effective in taking along, on the valve body (8) when the valve body (8) has been closed. Upon opening the adjustment element first performs an idle stroke, before the valve body is taken along. Upon closing the adjustment element performs an additional overtravel corresponding to the idle stroke, when the valve body already rests with both its valve disks on the respective valve seats.

11 Claims, 2 Drawing Sheets

OVERTRAVEL-DOUBLE SEAT MAGNETIC VALVE

The invention relates to a double seat valve, in particular for gas safety equipment, comprising a valve body with an upper valve disk and a lower valve disk, an upper valve seat for the upper valve disk and a lower valve seat disposed underneath for the lower valve disk, and an adjustment element for the valve body for opening this valve body against the action of a closing spring.

Gas slide valves with a flat slide as closing element are known for closing off pipes, which flat slide is slid in front of a bore from the side until the pipe is tightly sealed off. However, these flat slides are slid further in front of the bore by a certain overtravel than is necessary for closing off the pipe. Although the gas slide valves are not any tighter due to this overtravel, the perception developed that gas slide valves are particularly tight because they are closed further by the overtravel. A proof-of-closure switch is only activated after sealing and the overtravel by the slide.

Such gas slide valves are mainly used for manually closing off a gas pipe and to a lesser extent for controlling and adjusting the gas supply. A gas slide valve, driven mostly by a motor via a screw, opens and closes far too slowly for guaranteeing a fast safety shut-off of modern automatic gas-fired furnaces.

For valves with a valve disk, which seals when reaching the valve seat, and which cannot perform a further travel, the design as overtravel valve is very expensive and the basic idea of being safer can only be partly realized.

In FIG. 3 a known valve 100 with a first main valve disk 101 and an advancing second valve disk 102 is shown. However, with this valve disk 102 designed as rubber disk, which should improve the safety of the valve, the danger is that it prevents the main valve disk 101 from closing. Also, the rubber disk can tear due to wear and rest on the valve seat 103, which prevents closing. An elastically bearing advancing valve disk can tilt and thus again prevent the main valve disk from closing. The closing of the main valve disk can also be prevented if the advancing valve disk blocks a proof-of-closure switch.

It is hence the object of the invention to further develop a double seat valve of the above-mentioned type into an overtravel valve.

This object is solved according to the invention in that the valve body is guided displaceably on the adjustment element and that on the adjustment element a limit stop is provided which takes along the valve body in opening direction, which is spaced from its bearing, effective in taking along, on the valve body when the valve body is closed.

The advantage obtained with the invention is that the adjustment element first performs an idle stroke during opening, before the valve body is taken along. Upon closing the adjustment element makes an additional overtravel corresponding to the idle stroke, when the valve body already lies with its two valve disks on the respective valve seats.

In particularly preferred embodiments of the invention the adjustment element is displaceable into its bearing, effective in taking along, on the valve body against the action of a readjusting spring. Thus it is ensured that the adjustment element always performs the additional overtravel, also when the valve body has been closed. The closing spring of the double seat valve force-biasing the valve body in its closed position is designed such that a closing of the double seat valve is also ensured if the readjusting spring has been compressed. Thus the closing spring has an unequally greater force than the readjusting spring, which only serves for readjusting the adjustment element. The readjusting spring can be supported on the housing, or, which is preferred, between the valve body and the adjustment element.

The limit stop taking along the valve body can, for example, be a snap ring which is inserted into a snap ring groove of the adjustment element.

In order to minimize the friction between the valve body and the adjustment element, the adjustment element can be provided with a slide bearing for the valve body. Preferably the adjustment element is a magnetic armature with an armature tappet, on which the valve body is guided.

In preferred embodiments of the invention a proof-of-closure switch is provided, which can be activated by the adjustment element, which proof-of-closure switch switches only into its "close" position after the double seat valve is closed, and into its "open" position still before the double seat valve opens.

The invention also concerns an arrangement with at least two double seat valves, as they are described above, in a common housing. In such an arrangement the double seat valve on the input side as well as the double seat valve on the output side are then equipped with an overtravel.

Additional advantages of the invention can be gathered from the description and the drawing. Also, the previously mentioned and the following characteristics can be used according to the invention each individually or collectively in any combination. The embodiments shown and described are not to be taken as a conclusive enumeration, but have exemplary character for the description of the invention.

Figure 1:
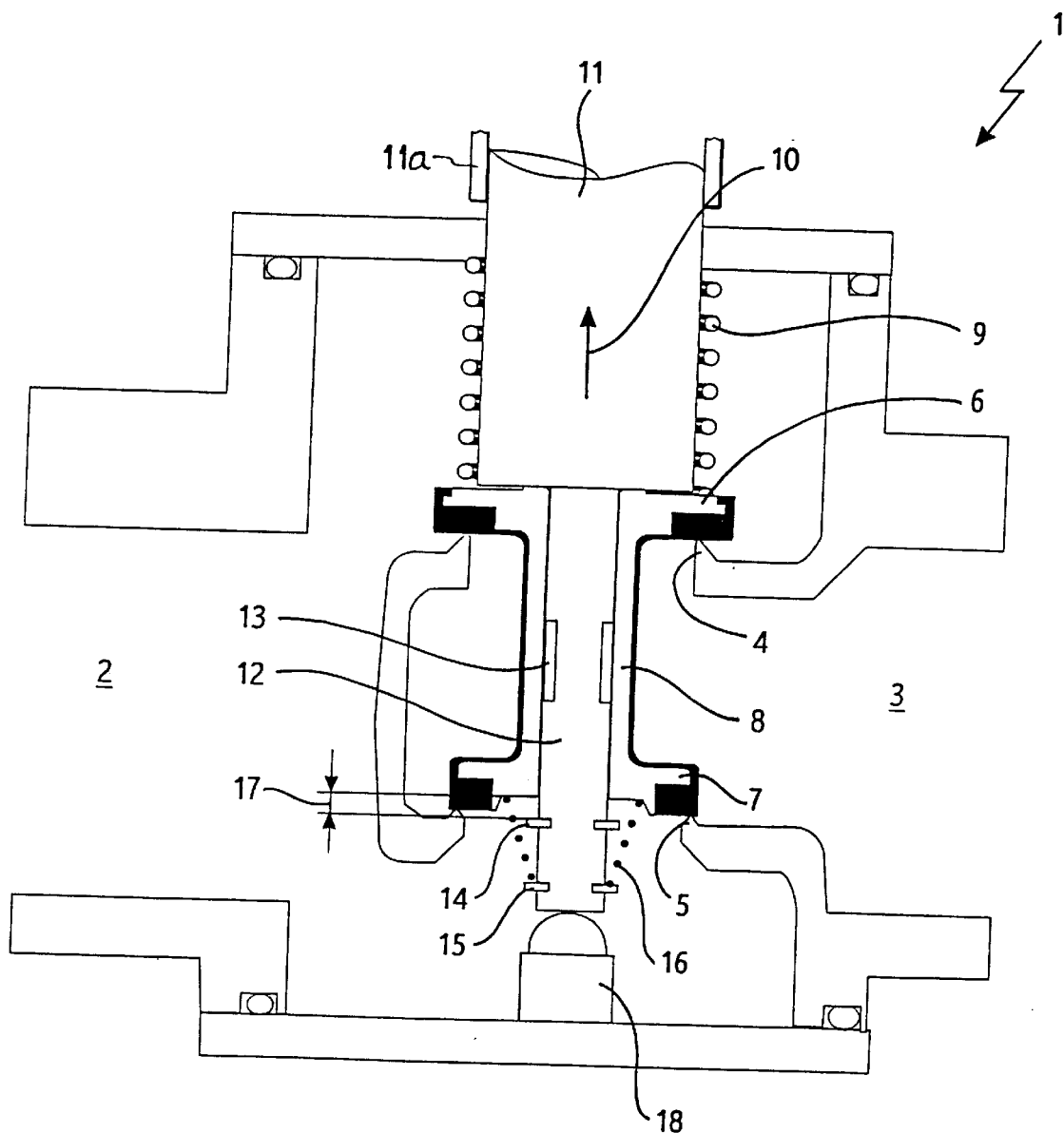
FIG. 1 shows an inventive double seat valve with an overtravel.

The double seat valve 1 shown in FIG. 1 is part of a gas fitting and is partitioned into a gas input space 2 and a gas output space 3, which are connected via an upper valve opening with an upper valve seat 4 and via a lower valve opening with a lower valve seat 5. Two valve disks 6, 7 of a valve body 8 cooperate with the two valve seats 4, 5, which valve body 8 is designed in one piece and rotationally symmetrical. The valve seats 4, 5 and the valve disks 6, 7 are designed such that always both valve seats are opened together the same distance. In the embodiment shown in FIG. 1 both valve seats 6, 7 bear from top on the allocated valve seats 4, 5. In the non-operative position the valve disks are held closed by a closing spring 9 in form of a helical pressure spring, which supports itself at one end on the valve body 8 and at the other end on an abutment mounted to the housing.

The valve body 8 is motion-coupled with an adjustment element in form of a magnetic armature 11 in opening direction 10, which extends into an electromagnet coil 11A. The valve body 8 is displaceably guided on an armature tappet 12 of the magnetic armature 11. For this purpose the armature tappet 12 engages through a central bore of the valve body 8 and is equipped with a slide bearing 13 in order to minimize the friction acting between the valve body 8 and the armature tappet 12.

At the free end of the armature tappet 12 a limit stop 14 engaging behind the valve body 8 in closing direction is provided as well as an abutment 15 for a readjusting spring (helical pressure spring) 16, which supports itself with the other end on the valve body 8. The limit stop 14 and the abutment 15 are each designed as snap rings in the embodiment shown, which are inserted into snap ring grooves at the free end of the armature tappet 12.

When the double seat valve 1 has been closed, the limit stop 14 is spaced from its bearing, effective in taking along, on the valve body 8 by a distance or an overtravel 17. Upon pick-up of the magnetic armature 11 in opening direction 10 the magnetic armature 11 first performs an idle stroke against the action of the readjustment spring 16, before the valve body 8 is taken along against the action of the closing spring 9 and the double seat valve opens. Upon closing of the double seat valve 1 the closing spring 9 pushes the valve body 8 back into its closing position. At the same time the readjusting spring 16 pushes the magnetic armature 11 even further in closing direction, until it hits on top against the valve body 8 and the limit stop 14 is spaced from the valve body 8 by the overtravel 17.

The closing spring 9 is designed such that a sealing of the valve body 8 is ensured even when the readjusting spring 16 has been compressed. The closing spring 9 has an unequally higher force than the readjusting spring 16, which only serves for canceling the weight of the magnetic armature 11, for overcoming the friction of the armature tappet 12 and for taking over the operating force of a proof-of-closure switch, which can be activated by the armature tappet 12. This proof-of-closure switch 18 only switches into its "close" position after the double seat valve is closed, and switches into its "open" position still before the double seat valve opens. This operating sequence of the proof-of-closure switch 18 is forcibly given by the different forces of the closing and readjusting springs 9, 16.

The advantages of this arrangement are primarily that, with the exception of the readjusting spring 16, no additional elements are necessary for creating the overtravel 17. The function of the valve body 8 is not impaired by the overtravel. A seal is also not necessary for sealing the armature tappet 12 which passes through the valve body 8 because in the location where the armature tappet 12 enters into the valve body 8, the same pressure prevails as in the location where it exits.

Figure 2:
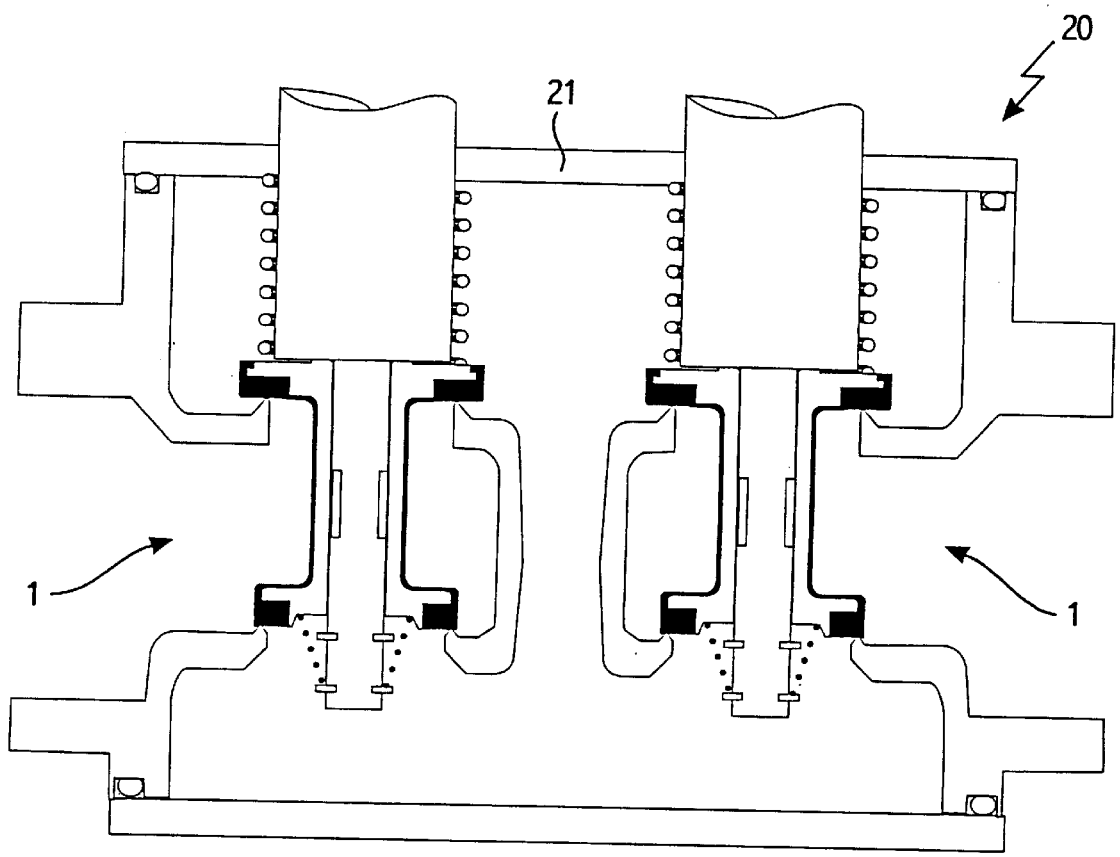
FIG. 2 shows an arrangement with two inventive double seat valves in a housing.
Figure 3:
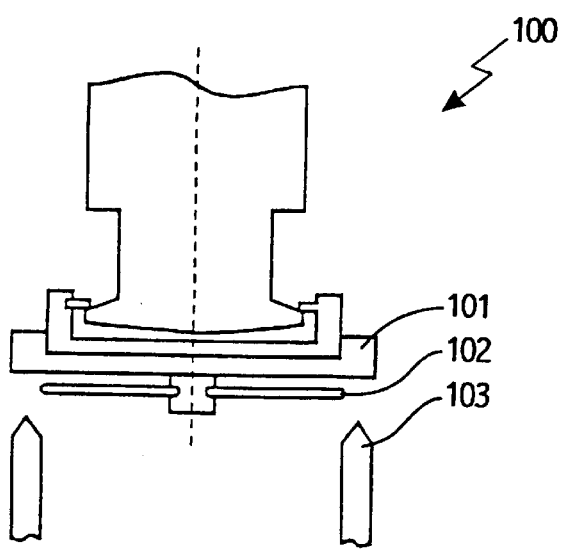
FIG. 3 shows a known valve with a main valve disk and an advancing second valve disk.

In the arrangement 20 shown in FIG. 2 two double seat valves 1 are disposed in a common housing 21, such that the double seat valve on the input side and on the output side is provided with an overtravel. It is possible, however, to design only one of both double seat valves with an overtravel.

What is claimed is:

1. A double seat magnetic valve comprising:
    a valve body with an upper valve disk and a lower valve disk;
    a upper valve seat for engaging the upper valve disk;
    a lower valve seat disposed underneath the upper valve seat for engaging the lower valve disk;
    a closing spring bearing against the valve body for engaging the upper valve disk against the upper valve seat and the lower valve disk against the lower valve seat;
    an adjustment element for moving the valve body in an opening direction against the action of the closing spring in order to separate the engagement between the upper valve disk and upper seat and the engagement between the lower valve disk and lower seat, the valve body being guided displaceably on the adjustment element; and
    a limit stop, disposed on the adjustment element, for taking the valve body along in the opening direction, the limit stop being spaced apart from the valve body when the valve body is in a closed position with the upper valve disk engaging the upper valve seat and the lower valve disk engaging the lower valve seat.

2. The double seat magnetic valve according to claim 1 further comprising a readjusting spring and wherein the adjustment element is displaceable along the valve body against the action of the readjusting spring before moving the valve body in the opening direction.

3. The double seat magnetic valve according to claim 2, wherein the readjusting spring is supported between the valve body and the adjustment element.

4. The double seat magnetic valve according to claim 1 wherein the limit stop, taking along the valve body, comprises a snap ring, said snap ring being inserted into a snap ring grove in the adjustment element.

5. The double seat magnetic valve according to claim 1 further comprising a slide bearing disposed between the adjustment element and the valve body.

6. The double seat magnetic valve according to claim 1 wherein the adjustment element comprises a magnetic armature with an armature tappet, the valve body being guided on the armature tappet.

7. The double seat magnetic valve according to claim 1, further comprising a proof-of-closure switch activated by the adjustment element.

8. The double seat magnetic valve according to claim 1, further comprising a bore through the valve body, the bore leading, on both sides, into a gas input space of the double seat magnetic valve, the valve body being guided through the bore by the adjustment element.

9. The double seat magnetic valve according to claim 1, further comprising a bore through the valve body, the bore leading, on both sides, into a gas input space of the double seat magnetic valve, the valve body being guided through the bore by the adjustment element.

10. Arrangement comprising at least two double seat magnetic valves according to claim 1 disposed in a common housing.

11. A double seat magnetic valve comprising:
    a valve housing;
    a valve body with an upper valve disk and a lower valve disk;
    a upper valve seat for engaging the upper valve disk;
    a lower valve seat disposed underneath the upper valve disk for engaging the lower valve disk;
    a closing spring disposed between the valve body and the valve housing for urging the upper valve disk against the upper valve seat and the lower valve disk against the lower valve seat;
    an adjustment element for moving the valve body in an opening direction against the action of the closing spring in order to separate the engagement between the upper valve and upper seat and the engagement between the lower valve disk and the lower seat, the valve body being guided displacement on the adjustment element.
    a magnetic drive for actuating the adjustment element;
    a limit stop, disposed on the adjustment element, is provided for taking the valve body along in the opening direction, the limit stop being spaced apart from the valve body when the valve body is in a closed position with the upper valve disk engaging the upper valve seat and the lower valve disk engaging the lower valve seat; and
    a readjusting spring supported between the valve body and the adjustment element, the adjustment element being displaceably guided within a bearing in the valve body and effective in taking along the valve body against the action of the readjusting spring.

* * * * *